United States Patent [19]

Pfleger

[11] 4,413,720

[45] Nov. 8, 1983

[54] ARTICLE HANDLING APPARATUS

[76] Inventor: Frederick W. Pfleger, 27 Cherry Ave., Maple Shade, N.J. 08052

[21] Appl. No.: 299,300

[22] Filed: Sep. 4, 1981

[51] Int. Cl.³ .............................................. B65G 47/00
[52] U.S. Cl. .................................... 198/345; 198/433; 198/451
[58] Field of Search ............... 198/345, 420, 433, 451, 198/425, 448, 445, 447, 474, 419, 424, 491; 140/3 CA

[56] References Cited

U.S. PATENT DOCUMENTS

| | | | |
|---|---|---|---|
| 2,575,220 | 11/1951 | Hiller | 198/433 |
| 2,744,610 | 5/1956 | Stiles | 198/433 |
| 3,008,563 | 11/1961 | Carter | 198/420 |
| 3,557,932 | 1/1971 | Laub | 198/420 |
| 3,608,694 | 9/1971 | Schlueter | 198/491 |
| 3,623,591 | 11/1971 | Koch et al. | 198/445 |
| 3,653,525 | 4/1972 | Merkner et al. | 198/433 |
| 4,029,195 | 6/1977 | Hartness et al. | 198/445 |

Primary Examiner—Joseph E. Valenza
Assistant Examiner—Jonathan D. Holmes
Attorney, Agent, or Firm—Robert K. Youtie

[57] ABSTRACT

Apparatus for handling quantities of articles, such as containers, including an input conveyor having guides for channeling the articles into rows or files longitudinally of the conveyor, a gating station operable to open the channels for passing a transverse row or rank of articles and close the channels for stopping input feed of the articles, a transverse row or rank of articles being adapted to be operated upon when stopped, and an exiting or removal station downstream of the gating station for receiving from the latter a rank of articles when the gating station is open and removing the received rank of articles when the gating station is closed.

7 Claims, 4 Drawing Figures

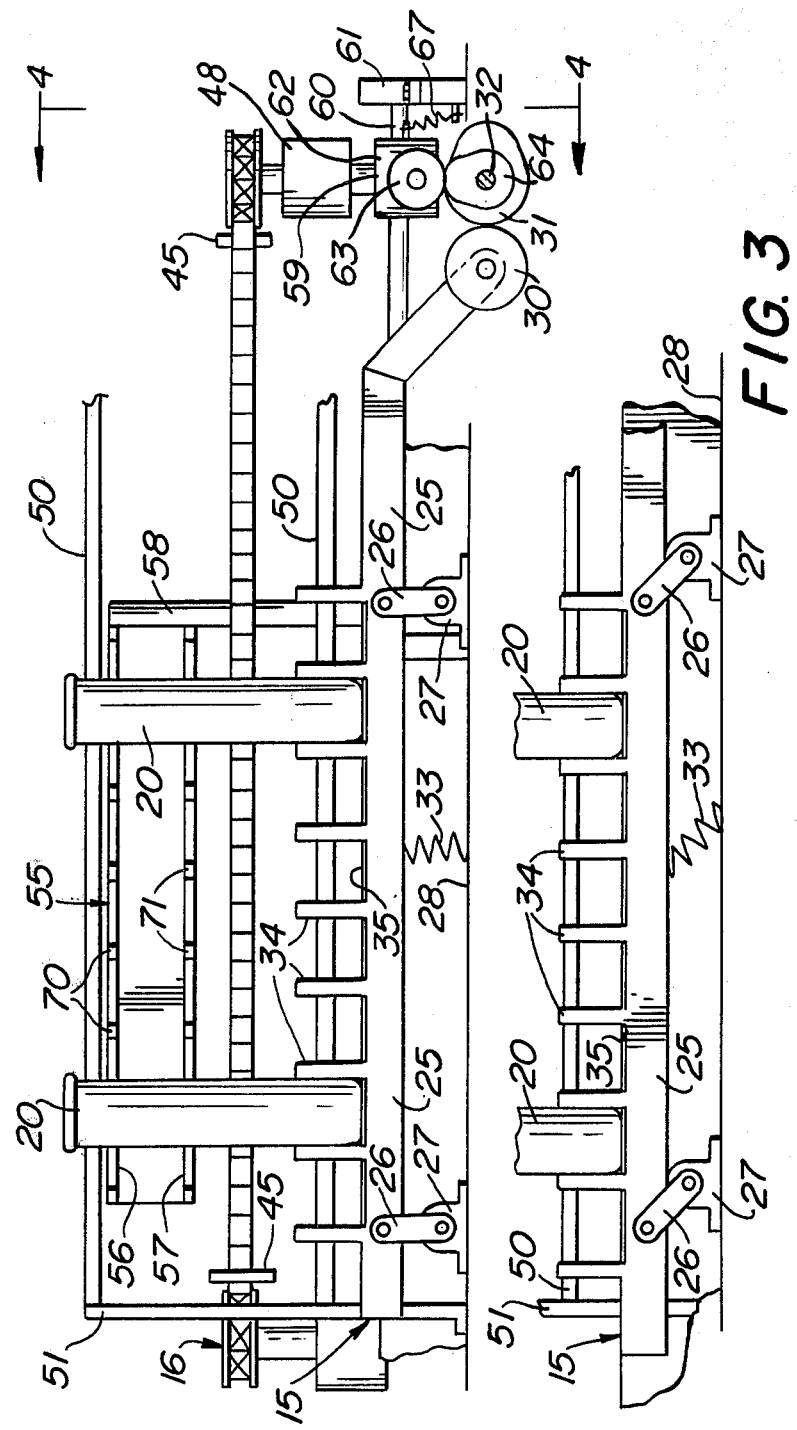

ARTICLE HANDLING APPARATUS

BACKGROUND OF THE INVENTION

As is well known to the industrial handling arts, there remain considerable problems in the high speed handling of large numbers of articles requiring specific orientation at an operating station and removal therefrom with little or no damage to the articles or downtime to the machine.

While the instant invention has been primarily developed and employed for use in handling relatively fragile articles, such as glass vials, as in the filling thereof, and will be illustrated and described hereinafter with specific reference thereto, it is understood that the invention is capable of many varied applications, all of which are intended to be comprehended herein.

In connection with such apparatus applicant is aware of the below listed prior art:

| U.S. Pat. No. | PATENTEE |
|---|---|
| 1,839,327 | Mayo |
| 2,187,842 | Rheinstrom |
| 2,935,173 | Cozzoli |
| 3,444,980 | Wiseman |
| 3,643,782 | Risley |
| 3,710,918 | Babunovic |
| 4,029,195 | Harness et al. |
| 2,530,419 | Bourland |
| 2,621,774 | Rourke |
| 2,918,161 | Edmonds et al. |
| 3,179,231 | Craig |
| 3,262,542 | McClelland |
| 3,322,167 | Rosen |
| 3,506,110 | Paul et al. |
| 3,536,179 | Pearson |
| 3,659,710 | Tice |

SUMMARY OF THE INVENTION

Accordingly, it is an important object of the present invention to provide an article handling apparatus of a type described which is capable of extremely high speed operation with little or no damage to articles being handled or downtime to the apparatus.

It is a more particular object of the present invention to provide an article handling apparatus of a type described wherein articles are arranged and fed in longitudinal files and transverse ranks, a gating station alternately closing the upstream files to movement to provide a stationary rank of articles at an operating station to be operated upon, and opening the files to movement for passing a previously operated upon rank to a transverse removal station for removal during the occurrence of closed time at the gating station.

It is another object of the present invention to provide a new and highly improved gating station construction and operation which not only closes or blocks the input feeding of articles, but also effectively isolates all articles from those being removed at the removal station to prevent intereference with the latter.

Another object of the present invention resides in the provision of a gating station wherein an entire transverse row of articles are moved with a gate upon gate movement into and out of a blocking position for closing and opening the gating station, all without jostling, jarring or otherwise adversely disturbing the articles on either side of the gating station.

Other objects of the present invention will become apparent upon reading the following specification and referring to the accampanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 2 is a sectional elevational view taken generally along the line 2—2 of FIG. 1.

FIG. 3 is a partial view similar to FIG. 2, but showing the gating station in an open position for passing articles.

DESCRIPTION OF THE PREFERRED EMBODIMENT

Figure 1:
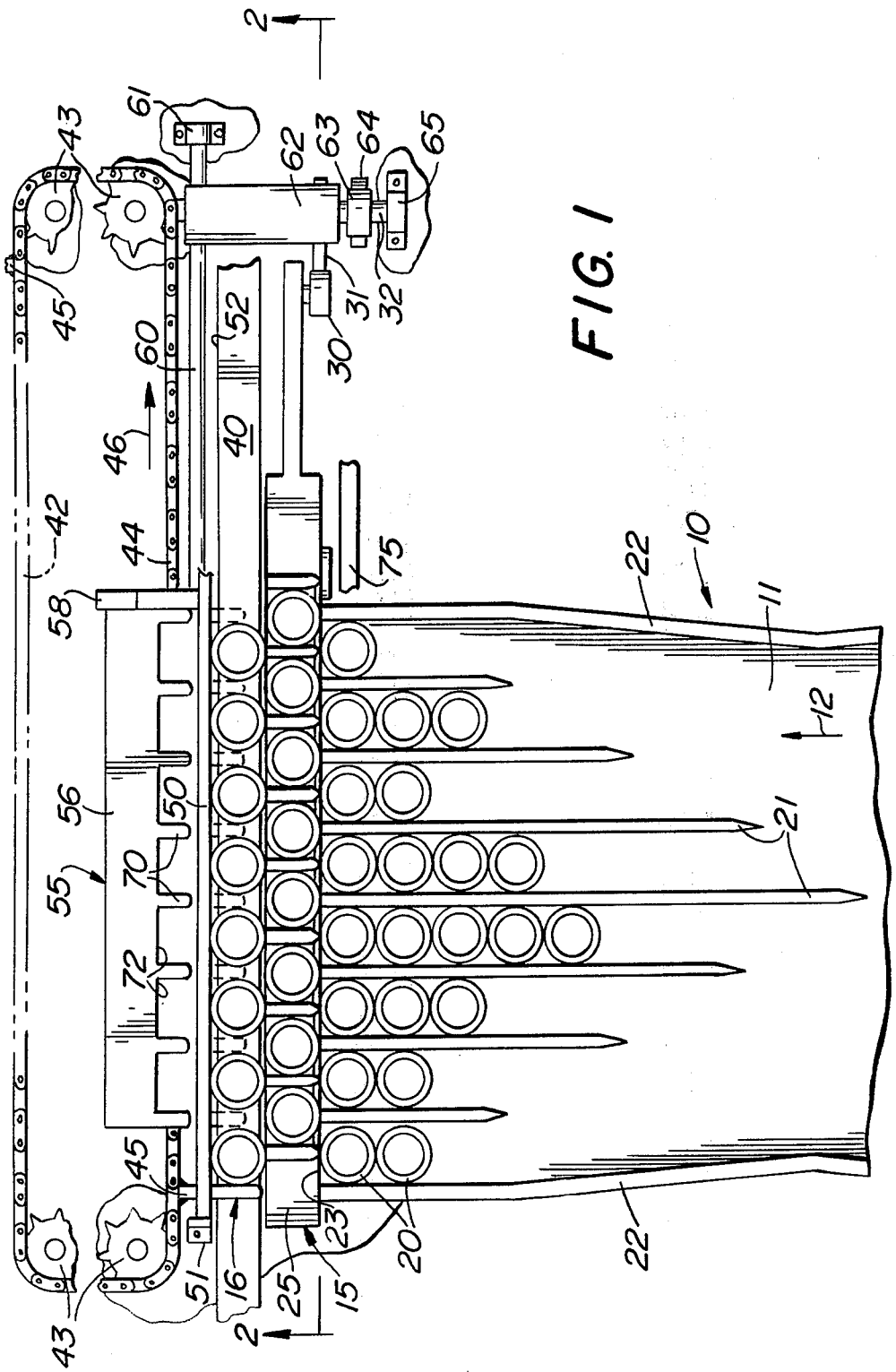
FIG. 1 is a top plan view showing an article handling apparatus constructed in accordance with the teachings of the present invention and illustrating the condition with the gating station closed to stop entering articles for filling or other operation and for removal of filled articles at an exiting station, a locator at the exiting station being shown in phantom in an article receiving position and in solid lines in an article removal position.

Referring now more particularly to the drawings, and specifically to FIG. 1 thereof, an input or feed conveyor is there generally designated 10, and may be of the belt type having its upper run 11 moving in the direction of arrow 12.

Just downstream of the feed conveyor 10 is a gate 15 extending generally transversely across the discharge end of the feed conveyor to open and close the latter. On the downstream side of the gate 15, opposite to the feed conveyor 10, there is an exiting station or removal conveyor 16. At the exiting station 16 a quantity of articles are removed transversely of the conveyor 10, as will appear more fully hereinafter.

The input or feed conveyor 10 may have its upper belt run 11 generally horizontal and gravitationally supporting a plurality of articles 20 fed by any suitable means onto the conveyor 10. Adjacent to the downstream end of the conveyor 10, there are suitably mounted a plurality of elongate guides or rails extending longitudinally of the conveyor, as at 21. More specifically extending along opposite side edges of the upper feed conveyor run 11 may be fixed side members or rails 22. Over the upper conveyor run 11, in spaced relation between the side rails 22 and in spaced relation with each other, are a plurality of the elongate guides or rail members 21 extending longitudinally of the nether conveyor. The guides or rail members 21 extend from the downstream or discharge end 23 of the feed conveyor 10 and upstream therefrom for varied distances. In particular, the laterally medial guide 21 is longest and extends the greatest distance upstream from the discharge end of the feed conveyor, while the next adjacent pair of guides 21 on opposite sides of the medial guide extend slightly less distance upstream from the discharge conveyor end. Each adjacent laterally outer guide extends upstream a successively less distance, as best seen in FIG. 1. The guides 21 may advantageously have their upstream ends tapering to more easily pass the articles 20 without obstacle thereto.

As the guides 21 are equally spaced apart from and in parallelism with each other, it will be appreciated that each pair of adjacent guides combines with its intermediate region of conveyor belt 11 to define an open ended channel for receiving the several articles 20 and orienting the same in a plurality of longitudinal rows or files and transverse rows or ranks.

The gate 15 is arranged proximate to the discharge end 23 of the conveyor 10, extending transversely thereacross, and may include an elongate, generally horizontal member or bar 25 mounted at spaced locations by a pair of parallel links 26 depending from the bar and pivoted at their lower ends to fixed journals 27 mounted to a support or base 28. Thus, the bar 25 is mounted for parallel movement between an upper or raised position shown in FIG. 2, and a lower position shown in FIG. 3. Also, the bar 25 is displaced horizontally between the upper and lower positions in a direction longitudinally of the bar and transversely of the input conveyor 10. One end of the bar 25 may be provided with suitable follower means, such as a roller 30, and a cooperating cam 31 may be carried by a rotary shaft 32 for driving engagement with the follower 30. Suitable resilient means are advantageously provided to urge the bar 25 upwardly, such as a coil compression spring 33, or other resilient biasing means.

On the upper side of the gate bar 25 there upstands therefrom a row of partitions or separators, as at 34. The partitions or separators 34 are spaced apart from each other equal distances, which distances are equal to the space between the guides 21. Further, in the lowered or down position of gate 15, the upper surface 35 of bar 25 is generally flush with the upper surface of feed conveyor run 11; and further, the partitions or dividers 34 are each in alignment longitudinally of the conveyor with a respective guide or rail 21. In the elevated condition of gate 15 the upper bar surface 35 is vertically spaced an increment above the upper surface of feed conveyor 11; and, the partitions or separators 34 are offset from or out of alignment with respect to the guides 21. More specifically, the separators or partitions 34 in the raised gate condition may be each laterally medially of an adjacent pair of guides 21, as seen in FIG. 1.

The exiting or removal station 16 may include an article support member or plate 40 suitably fixed in position with respect to the base 28 and extending longitudinally along the bar 25 of gate 15 on the opposite side thereof as the conveyor 10. The plate 40 has its upper surface 41 at the same elevation as the upper surface of the upper run 11 of feed conveyor 10 so as to be flush with the upper surface 35 of gate bar 35 when the latter is in its lowered position.

The removal conveyor may further include an endless member or chain 42 suitably driven in a horizontal path about a plurality of rotary members or sprocket wheels 43. The endless member or chain 42 may include a horizontal run 44 extending generally along the plate 40, and may be provided with arms or paddles, as at 45 outstanding from spaced locations along the chain to move therewith longitudinally along and over the plate 40 say in the direction of arrow 46.

The endless member or chain 42 may be driven by one of the sprocket wheels 43 (see FIG. 4) mounted on an upstanding shaft 47 carried by a bracket 48 and driven through level gearing 49 from the cam shaft 32.

Extending along the removal conveyor plate 40, at vertically spaced elevations, are a pair of generally horizontal fixed guide members or rails 50, suitably mounted by one or more standards 51, see FIGS. 1 and 2. The guide rails 50 are vertically spaced apart, and approximately over the longitudinal edge 52 of plate or strip 40 remote from the gate bar 25. Thus, the rails or guides 50 combine to define a fence along the plate or strip 40 spaced from the gate 25, for a purpose appearing presently.

Figure 4:
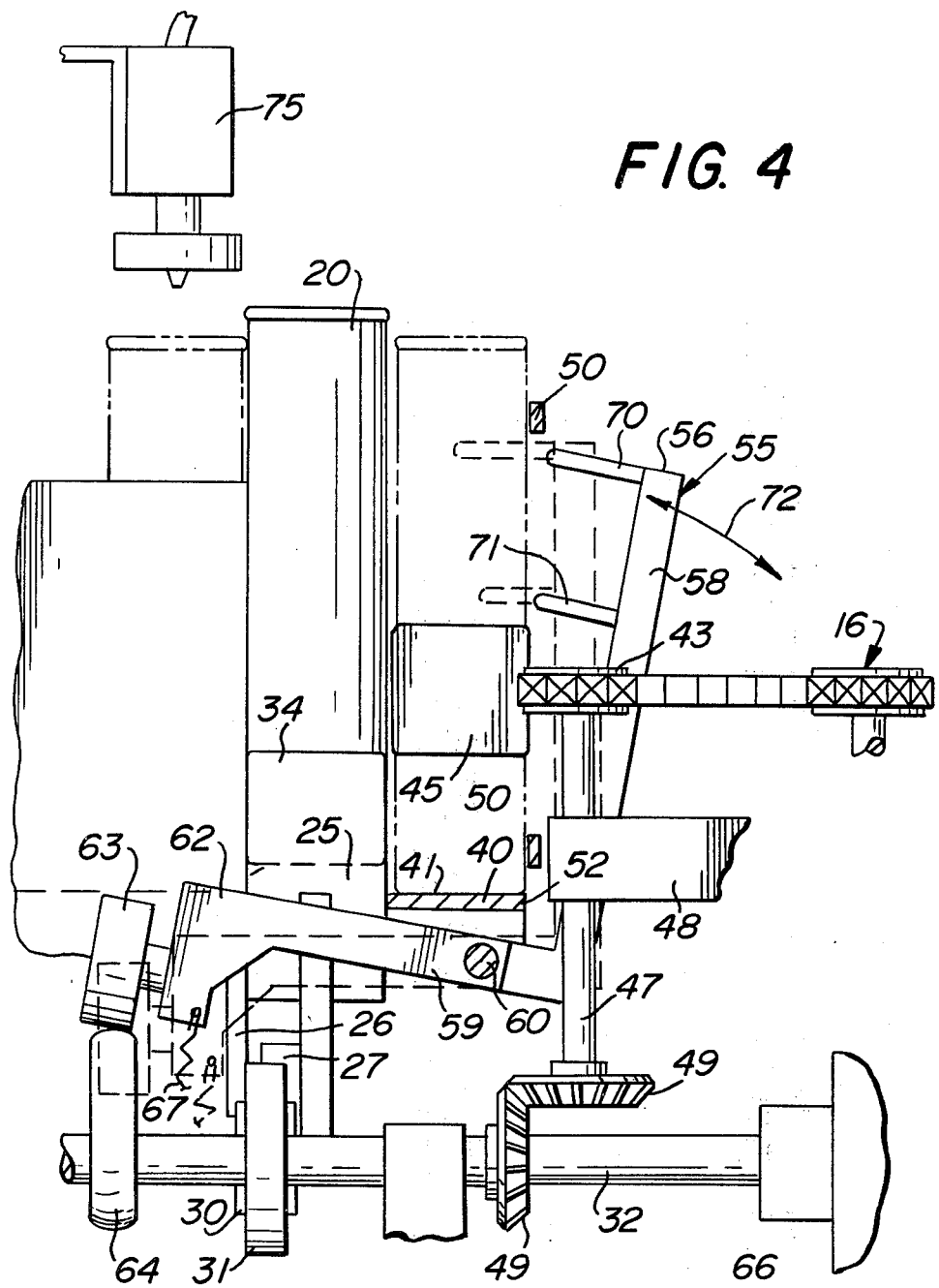
FIG. 4 is a sectional elevational view taken generally along the line 4—4 of FIG. 2.

Extending along the fence 50 is an article locator 55 including a pair of upper and lower, parallel spaced, generally horizontal elongate members or bars 56 and 57. These bars are rigidly mounted to a generally upstanding arm 58 of a bell crank 59. The crank arm 58 may extend upwardly within the confines of the endless chain 42, and may be pivoted about a shaft 60 extending generally horizontally below the removal conveyor plate or strip 40, as seen in FIG. 4. The shaft 60 may be suitably journaled at one end, as by a bearing 61, see the right hand side of FIG. 1.

Referring again to FIG. 4, the other arm 62 of bell crank 59 extends generally horizontally and forwardly or in the upstream direction of feed conveyor 10. As best seen in FIG. 1, the arm 62 is offset from the arm 58, both arms being fixed to the shaft 60, with the arm 62 rightward as seen in FIG. 1. On the forward or distal end of arm 62 there may be provided a cam follower or roller 63 for engagement with a cam 64 on the shaft 32. The forward end of the shaft 32, as seen in FIG. 1, may be suitably journaled, as by a bearing 65, while the rearward end of the cam shaft may be suitably driven, as at 66 in FIG. 4. Suitable resilient biasing means, such as a tension spring 67 may urge the shaft 60 and crank 59 counterclockwise (as seen in FIG. 4) to maintain the follower 63 in its following engagement with the cam 64.

The horizontal bars 56 and 57 of the locator 55 are each provided with a plurality of forwardly projecting pins or fingers, as at 70 and 71, respectively. That is, along the upper bar 55 and projecting therefrom generally toward the feed conveyor 10 is a generally horizontal row or series of equally spaced apart projections or fingers 70. Similarly, the projections or fingers 71 are equally spaced apart and project in a generally horizontal row from the lower bar 57. Further, the fingers 70 are horizontally spaced apart a distance equal to the spacing inbetween guide rails 21 and also to the spacing between partitions 34; as are the lower bar fingers 71. Also, the upper fingers 70 are each directly over a respective lower finger 61. The upper fingers 70 may project from their bar 56 slightly further than the lower fingers 71, as best seen in FIG. 4.

Thus, each adjacent pair of upper fingers 70 and its vertically aligned adjacent pair of lower fingers 61 combine with the bars 56 and 57 to define a receiver or pocket 72 facing generally toward the gate 15 and infeed conveyor 10, for a purpose appearing presently.

As best seen in FIGS. 1 and 4, the locator 55 is swingable about the axis of shaft 60 between a forward, receiving position shown in phantom, and a rearward releasing position shown in solid lines, as in the direction of arrow 72 in FIG. 4. In the receiving position, the pins or fingers 70 and 71 extend over the plate or strip 40 of the removal conveyor 16, with the pockets or receivers 72 opening into respective passageways or spaces between adjacent partitions 34, and in respective alignment with the channels defined between adjacent guide members 21. In the solid line, rearwardly swung releasing position of the locator 55, the fingers 70 and 71 have been retracted rearwardly beyond the fence 50, 50. This movement of locator 55 between its receiving and releasing positions is timed, as by the cams 64 and 31 with the combined vertical and horizontal movement of the gate 15, Specifically, the locator 55 is in its forward, receiving position when the gate 15 is in its lowered aligned position having its upper surface 35 flush with the upper surfaces of conveyors 10 and 16, and its partitions 34 in respective alignment with the conveyor guides 21 and receiver fingers 70, 71.

In operation, the belt 11 of feed conveyor 10 may run continuously in the direction of arrow 12 so as to form aligned columns or files of articles, such as vials 20 in the several channels defined between adjacent pairs of guides 21 and side rails 22. In the solid line position of FIG. 1, the gate bar 25 has been shifted laterally about a half of channel width to locate the several partitions 34 each medially between an adjacent pair of guides 21 and rails 22 to close the channels defined thereby. Also, the gate bar 25 is shifted to its upper position having its upper surface 35 above the upper surface of the conveyor belt 11. The several longitudinal rows, columns or files of articles 20 on the belt 11 are thus maintained in position, while the belt continues to move and slides beneath the articles. One lateral row or rank of articles 20, say the lateral row closest to the discharge end 23 of the conveyor belt 11 may be operated upon, as desired. For example, the illustrated vials 20 may be filled, as from a filler assembly 75 located over the endmost lateral row of vials on the feed conveyor 10. The endmost lateral or transverse row of vials 20 on the conveyor 10 may be considered as in an operating station; and, various operations may be performed, such as cleaning, inspection, or other.

Upon movement of the gate 15 to its open position, with the gate bar 25 lowered and shifted leftward to the position shown in FIG. 3, the upper gate bar surface is flush with the upper surface of conveyor belt 11 for receiving articles in the openings or passageways through the gate. Also at this time, the locator 55 is in its receiving, phantom position of FIGS. 1 and 4 and the upper gate bar surface 35 is substantially flush with the upper surface 41 of strip 40 for movement of articles through the gate into respective receivers 72 on the strip 40.

Upon return to the gate 15 to its elevated and laterally shifted closed position (as shown in solid lines in FIG. 1), and return of the locator 55 to its open, solid line position, the articles left remaining on the strip 40 are retained thereon between the rail members or fence 50, 50 and the adjacent side of elevated gate bar 25. In timed sequence with this gate closing and locator opening movement, the removal conveyor 16 operates to move one of the arms 45 in the direction of arrow 46 to pass the downstreammost transverse row of articles along the strip 50 for filling, packing, or other. It will be appreciated that the articles moving on strip 40 are effectively constrained against movement out of the space between the fence 50, 50 and the raised gate bar 25; and that the articles being removed will not be obstructed by the articles on gate 15, or otherwise impeded. Further, as the gate bar 25 is of a width approximating that of the articles, it may be shifted between transverse rows of articles without jostling or otherwise adversely disturbing the adjacent transverse rows of articles. If desired, other specific removal conveyor means may be employed. Also, the feed conveyor may be other than the type illustrated, for example it having been found satisfactory in conveying lipped vials of the type illustrated by suspending the vials from their lips and providing a nether opening for gravitational removal of vials not properly suspended. This may minimize jamming in certain circumstances. Also, it will be apparent that the gate bar 25 is resiliently and yieldably urged upwardly by the compression spring 33, so that the incorrect positioning of a glass vial or other article on the gate will not cause damage to the article, but may be sensed and cause stopping of the apparatus. Of course, other suitable safety features may be employed, as desired.

From the foregoing, it is seen that the present invention provides an article handling apparatus for safe and high speed handling of large numbers of articles, even relatively delicate articles such as glass containers, which is extremely simple in construction and operation, durable and reliable throughout a long useful life, and otherwise fully accomplishes its intended objects.

Although the present invention has been described in some detail by way of illustration and example for purposes of clarity of understanding, it is understood that certain changes and modifications may be made within the spirit of the invention.

What is claimed is:

1. Article handling apparatus comprising a generally horizontal feed conveyor, a plurality of longitudinal guides along and subdividing said feed conveyor into channels for passing aligned rows of articles and terminating at a station, a gate extending transversely of said feed conveyor at said station and generally coplanar with said feed conveyor to receive and support a transverse row of articles from said station, a removal conveyor extending along said gate generally coplanar therewith for receiving and removing a transverse row of articles, and means for shifting said gate upwardly while supporting a transverse row of articles to block the next upstream transverse row of articles at said station for operating on said blocked articles.

2. Article handling apparatus according to claim 1, said gate including a plurality of through passageways in respective aligned open relation with said channels and shiftable out of and into said aligned open relation.

3. Article handling apparatus according to claim 2, in combination with a locator extending along said removal conveyor opposite to said gate and having a plurality of article receivers facing toward respective channels, said locator being moveable between a receiving position toward said gate and a releasing position away from said gate, for receiving articles from said gate when the gate passageways are in said aligned open relation and releasing articles when said gate is in its blocking condition.

4. Article handling apparatus according to 1, said gate comprising a bar generally level with said feed and removal conveyors, and a row of partitions upstanding from said bar in spaced relation therealong for respective alignment with said guides, said partitions and bar combining to define therebetween said passageways, said gate shifting means elevating said bar along and above the plane of said removal conveyor, to prevent interference between articles on said removal conveyor and said gate.

5. Article handling apparatus according to claim 4, in combination with a locator extending along said removal conveyor opposite to said gate and having a plurality of article receivers facing toward respective channels, said locator being moveable between a receiving position toward said gate and a releasing position away from said gate, for receiving articles from said gate when the gate passageways are in said aligned open relation and releasing articles when said gate is in its blocking and elevated condition.

6. Article handling apparatus according to claim 5, said feed conveyor moving in timed relation with said gate for displacing said articles through said passageways and into said receivers.

7. Article handling apparatus according to claim 4, said removal conveyor including a support surface extending along and generally level with said gate bar when the latter is not in its blocking condition, a fence along said support surface spaced from said gate, and an arm movable along and over said support surface when said gate is in its blocking condition to displace articles along said support surface constrained between said gate bar and fence.

* * * * *